US009797782B2

United States Patent
Kasajima et al.

(10) Patent No.: US 9,797,782 B2
(45) Date of Patent: Oct. 24, 2017

(54) TEMPERATURE DISTRIBUTION MEASUREMENT APPARATUS AND TEMPERATURE DISTRIBUTION MEASUREMENT METHOD

(71) Applicant: FUJITSU LIMITED, Kawasaki-shi, Kanagawa (JP)

(72) Inventors: Takeo Kasajima, Machida (JP); Kazushi Uno, Atsugi (JP); Minoru Ishinabe, Atsugi (JP); Kyoko Tadaki, Atsugi (JP); Fumio Takei, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 268 days.

(21) Appl. No.: 14/171,880

(22) Filed: Feb. 4, 2014

(65) Prior Publication Data
US 2014/0146850 A1   May 29, 2014

Related U.S. Application Data

(63) Continuation of application No. PCT/JP2011/068503, filed on Aug. 15, 2011.

(51) Int. Cl.
*G01K 11/00* (2006.01)
*G01K 3/00* (2006.01)
(Continued)

(52) U.S. Cl.
CPC ........ *G01K 11/32* (2013.01); *G01K 2011/324* (2013.01)

(58) Field of Classification Search
USPC ................. 374/161, 137, 124, 1, 120, 131
See application file for complete search history.

(56) References Cited

U.S. PATENT DOCUMENTS 5,054,935 A * 10/1991 Tanabe .................. G01K 11/32
250/227.14
5,178,455 A * 1/1993 Ohsaki ..................... B03B 9/00
106/639
(Continued)

FOREIGN PATENT DOCUMENTS

JP   H03-135743 A   6/1991
JP   H04-50624 A    2/1992
(Continued)

OTHER PUBLICATIONS

EESR—European Search Report of European Patent Application No. 11870967.4 dated Jan. 26, 2015.
(Continued)

*Primary Examiner* — Mirellys Jagan
(74) *Attorney, Agent, or Firm* — Fujitsu Patent Center

(57) ABSTRACT

A temperature distribution measurement apparatus includes a laser light source optically connected to an optical fiber, a photodetector configured to detect light backscattered in the optical fiber, and a temperature distribution measurement unit configured to obtain a true measured temperature distribution by performing correction calculation using a transfer function on a temporary measured temperature distribution obtained based on an output from the photodetector. The temperature distribution measurement unit stores therein data on a transfer function set for each entire length of the optical fiber and for each longitudinal position in the optical fiber. Then, when the length of the optical fiber is changed, the temperature distribution measurement unit changes the transfer function to be used in the correction calculation by using the data on the transfer function.

12 Claims, 12 Drawing Sheets

(51) Int. Cl.
   *G01J 5/00*       (2006.01)
   *G01K 1/00*       (2006.01)
   *G01K 11/32*      (2006.01)

(56) References Cited

U.S. PATENT DOCUMENTS

| | | | |
|---|---|---|---|
| 5,639,162 A | 6/1997 | Sai | |
| 5,765,948 A * | 6/1998 | Sai | G01K 11/32 250/227.14 |
| 5,825,804 A * | 10/1998 | Sai | G01K 11/32 250/227.18 |
| 2007/0229816 A1 * | 10/2007 | Chen | G01K 11/32 356/301 |
| 2008/0232425 A1 * | 9/2008 | Hall | G01K 15/00 374/1 |
| 2010/0128756 A1 * | 5/2010 | Lee | G01K 11/32 374/161 |
| 2011/0231130 A1 * | 9/2011 | Hong | G01J 1/0223 702/82 |
| 2012/0033709 A1 * | 2/2012 | Kasajima | G01K 11/32 374/161 |
| 2013/0215930 A1 * | 8/2013 | Kasajima | G01K 13/10 374/161 |
| 2014/0153611 A1 * | 6/2014 | Kasajima | G01K 15/00 374/130 |
| 2014/0233600 A1 * | 8/2014 | Lee | G01K 15/005 374/1 |
| 2014/0241396 A1 * | 8/2014 | Shida | G01K 11/32 374/161 |
| 2015/0226679 A1 * | 8/2015 | Uno | G01K 11/32 702/182 |

FOREIGN PATENT DOCUMENTS

| | | |
|---|---|---|
| JP | 5-172656 | 7/1993 |
| JP | 2009-265077 A | 11/2009 |
| JP | 2010-107279 A | 5/2010 |
| JP | 2010-160081 A | 7/2010 |
| WO | WO 2010-125712 A1 | 11/2010 |

OTHER PUBLICATIONS

International Search Report, mailed in connection with PCT/JP2011/068503 dated Oct. 11, 2011.

* cited by examiner

ACTUAL TEMPERATURE DISTRIBUTION

MEASURED TEMPERATURE DISTRIBUTION

FIG. 14

| ENTIRE LENGTH (L) | POSITION (X) | | | | | | | | |
|---|---|---|---|---|---|---|---|---|---|
| | 0m | 1000m | 2000m | 3000m | 4000m | 5000m | 6000m | 7000m | 8000m |
| 1000m | H$_{1000,0}$(p) | H$_{1000,1000}$(p) | — | — | — | — | — | — | — |
| 2000m | H$_{2000,0}$(p) | H$_{2000,1000}$(p) | H$_{2000,2000}$(p) | — | — | — | — | — | — |
| 3000m | H$_{3000,0}$(p) | H$_{3000,1000}$(p) | H$_{3000,2000}$(p) | H$_{3000,3000}$(p) | — | — | — | — | — |
| 4000m | H$_{4000,0}$(p) | H$_{4000,1000}$(p) | H$_{4000,2000}$(p) | H$_{4000,3000}$(p) | H$_{4000,4000}$(p) | — | — | — | — |
| 5000m | H$_{5000,0}$(p) | H$_{5000,1000}$(p) | H$_{5000,2000}$(p) | H$_{5000,3000}$(p) | H$_{5000,4000}$(p) | H$_{5000,5000}$(p) | — | — | — |
| 6000m | H$_{6000,0}$(p) | H$_{6000,1000}$(p) | H$_{6000,2000}$(p) | H$_{6000,3000}$(p) | H$_{6000,4000}$(p) | H$_{6000,5000}$(p) | H$_{6000,6000}$(p) | — | — |
| 7000m | H$_{7000,0}$(p) | H$_{7000,1000}$(p) | H$_{7000,2000}$(p) | H$_{7000,3000}$(p) | H$_{7000,4000}$(p) | H$_{7000,5000}$(p) | H$_{7000,6000}$(p) | H$_{7000,7000}$(p) | — |
| 8000m | H$_{8000,0}$(p) | H$_{8000,1000}$(p) | H$_{8000,2000}$(p) | H$_{8000,3000}$(p) | H$_{8000,4000}$(p) | H$_{8000,5000}$(p) | H$_{8000,6000}$(p) | H$_{8000,7000}$(p) | H$_{8000,8000}$(p) |

TEMPERATURE DISTRIBUTION MEASUREMENT APPARATUS AND TEMPERATURE DISTRIBUTION MEASUREMENT METHOD

CROSS-REFERENCE TO RELATED APPLICATION

This application is a continuation of International Patent Application No. PCT/JP2011/068503 filed Aug. 15, 2011 and designated the U.S., the entire contents of which are incorporated herein by reference.

FIELD

The embodiments discussed herein are related to a temperature distribution measurement apparatus and a temperature distribution measurement method which use an optical fiber.

BACKGROUND

In recent years, with the arrival of a high-level information society, a large amount of data is handled by computers. Many computers are often installed in the same room in an institution such as a data center and managed collectively. Under such circumstances, a large amount of heat is produced by the computers to cause malfunction or breakdown; therefore, means for cooling the computers is used. Thus, generally in a data center, fans are used to allow heat produced inside the computers to escape to the outside of the computers, and also, the temperature of the room is adjusted by an air conditioner.

Depending on the operation statuses of the computers, the amount of heat produced by the computers fluctuates. To prevention of heat-related malfunction or breakdown of the computers, it may be conceivable to, for example, use an air conditioner having cooling capacity corresponding to the maximum amount of heat produced by the computers and constantly operate the air conditioner at its maximum capacity. However, operating the air conditioner of high cooling capacity at its maximum capacity constantly is not preferable not only because it increases running costs, but also in view of energy saving and $CO_2$ reduction. For this reason, it is desired that air conditioning be controlled efficiently according to the amount of heat produced by each rack.

For efficient control of air conditioning, the temperature of each rack installed in the data center prefers to be measured in real time. It has conventionally been proposed to use an optical fiber as a temperature sensor for measuring a temperature distribution of an area having a plurality of heat sources, such as a data center.

Patent Document 1: Japanese Laid-open Patent Publication No. 2009-265077

Patent Document 2: Japanese Laid-open Patent Publication No. 2010-160081

SUMMARY

According to one aspect of the technique disclosed, provided is a temperature distribution measurement apparatus including a laser light source optically connected to an optical fiber, a photodetector configured to detect light backscattered in the optical fiber, and a temperature distribution measurement unit configured to obtain a true measured temperature distribution by performing correction calculation using a transfer function on a temporary measured temperature distribution obtained based on an output from the photodetector. In the temperature distribution measurement apparatus, the temperature distribution measurement unit stores therein data on a transfer function set for each entire length of the optical fiber and for each longitudinal position in the optical fiber.

According to another aspect of the technique disclosed, provided is a temperature distribution measurement method employed by a temperature distribution measurement apparatus configured to output laser light from a laser light source to an optical fiber, obtain a temporary measured temperature distribution in a longitudinal direction of the optical fiber by detecting light backscattered in the optical fiber, and obtain a true measured temperature distribution by performing correction calculation on the temporary measured temperature distribution by use of a transfer function. In the temperature distribution measurement method, the temperature distribution measurement apparatus stores therein data on a transfer function set for each entire length of the optical fiber and for each longitudinal position in the optical fiber, and when a length of the optical fiber optically connected to the laser light source is changed, the temperature distribution measurement apparatus changes the transfer function to be used in the correction calculation by using the data on the transfer function.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating an example of (database of) data on a transfer function for each entire length of an optical fiber and each longitudinal position in the optical fiber.

DESCRIPTION OF EMBODIMENTS

Before an embodiment is described, a prelude is given below to facilitate understanding of the embodiment.

An optical fiber has a low position resolution. Thus, in a place having a high density of temperature measured locations (measurement points), it is difficult to accurately and efficiently measure a temperature distribution with an optical fiber used as a temperature sensor. Thus, the inventors of the present application have proposed, in Patent Document 1 (Japanese Laid-open Patent Publication No. 2009-265077), Patent Document 2 (Japanese Laid-open Patent Publication No. 2010-160081), and the like, techniques for using a transfer function to correct a temperature distribution in a longitudinal direction of an optical fiber obtained by a temperature distribution measurement apparatus. This enables accurate, efficient measurement of the temperatures at densely-arranged measurement points.

A transfer function changes depending upon the distance from a light source (a distance in the longitudinal direction of an optical fiber) and upon the entire length of the optical fiber. Since server racks are added or removed according to demands in a data center, the addition or removal changes the route for laying the optical fiber or the entire length of the optical fiber. Hence, it is important to set a transfer function anew after the laying work.

In the embodiment below, a description is given of a temperature distribution measurement apparatus and a temperature distribution measurement method capable of easily setting an appropriate transfer function in response to a change in the entire length of an optical fiber.

(Embodiment)

Figure 1:
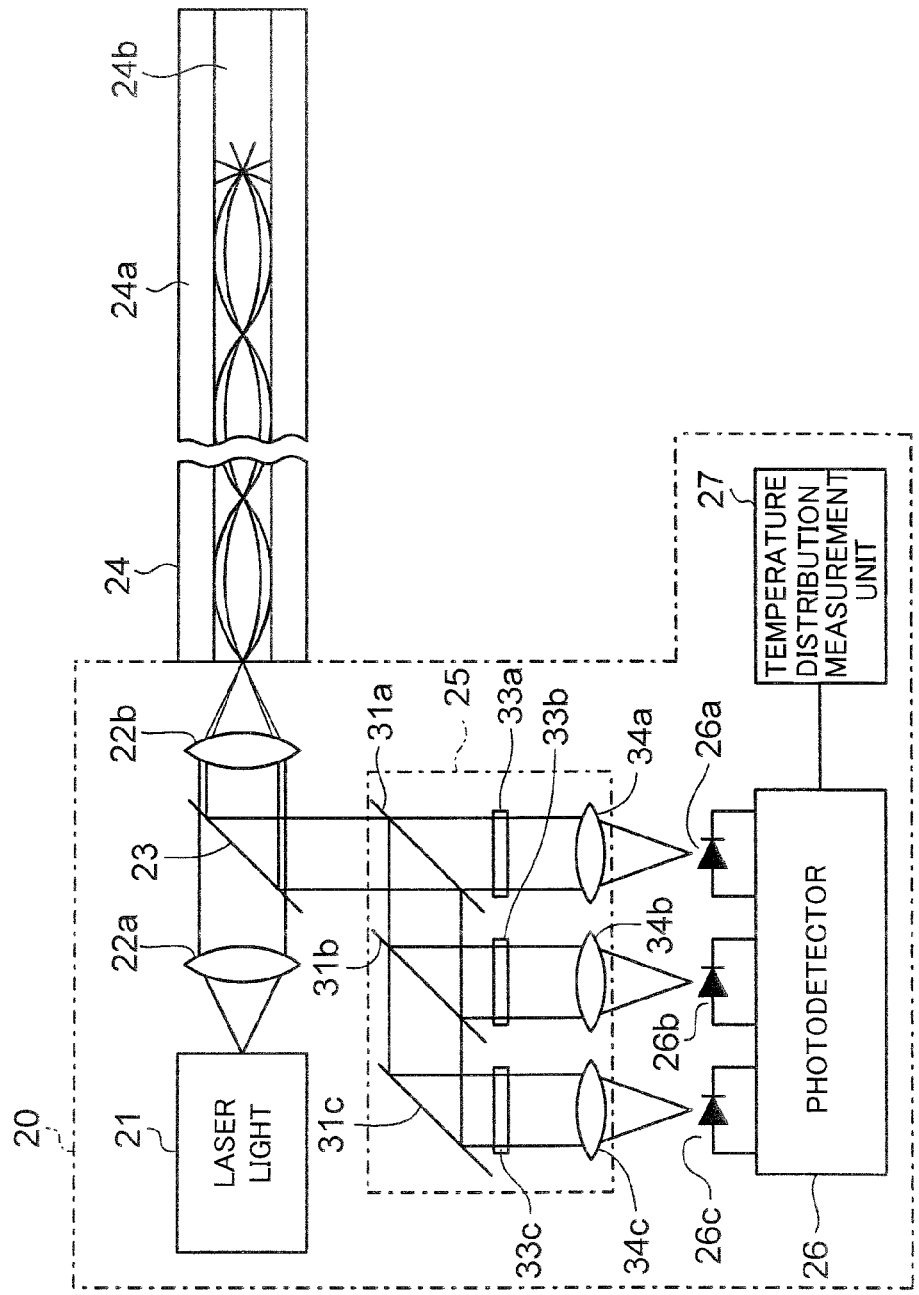
FIG. 1 is a schematic diagram illustrating the configuration of a temperature distribution measurement apparatus according to an embodiment.
Figure 2:
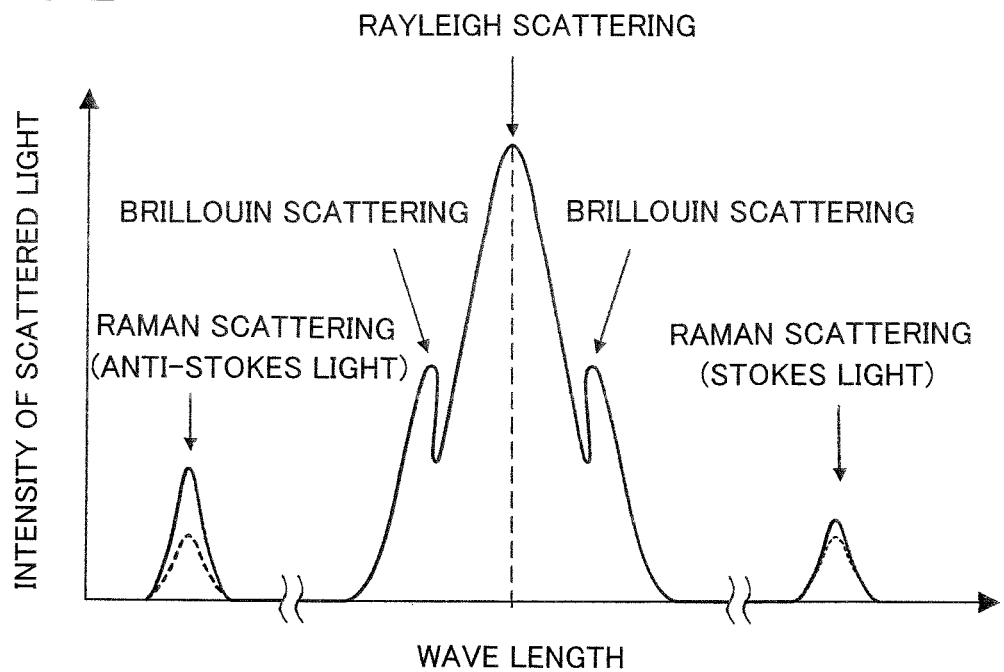
FIG. 2 is a diagram illustrating a spectrum of backscattered light.

FIG. 1 is a schematic diagram illustrating the configuration of a temperature distribution measurement apparatus according to an embodiment, and FIG. 2 is a diagram illustrating a spectrum of backscattered light.

As illustrated in FIG. 1, a temperature distribution measurement apparatus 20 according to this embodiment has a laser light source 21, lenses 22a, 22b, a beam splitter 23, a wavelength separation section 25, a photodetector 26, and a temperature distribution measurement unit 27, and is connected to an optical fiber 24 when used.

The laser optical source 21 outputs laser light of a predetermined pulse width at constant intervals. This laser light passes through the lens 22a, the beam splitter 23, and the lens 22b and enters the optical fiber 24 from a light-source-side end portion of the optical fiber 24. In FIG. 1, reference numeral 24a denotes a cladding of the optical fiber 24, and reference numeral 24b denotes a core of the optical fiber 24.

Part of the light entering the optical fiber 24 is backscattered by molecules constituting the optical fiber 24. The backscattered light includes, as illustrated in FIG. 2, Rayleigh scattered light, Brillouin scattered light, and Raman scattered light. The Rayleigh scattered light is light having the same wavelength as incident light, and the Brillouin scattered light and Raman scattered light are light whose wavelengths are shifted from that of the incident light.

Raman scattered light includes Stokes light whose wavelength is shifted toward a longer wavelength side of the incident light and anti-Stokes light whose wavelength is shifted toward a shorter wavelength side of the incident light. The shift amount of the Stokes light or the anti-Stokes light is generally about 50 nm, although it depends on the wavelength of the laser light and the substance forming the optical fiber 24 or the like. The intensity of each of the Stokes light and the anti-Stokes light changes according to temperature, and the Stokes light changes by a small amount due to temperature, while the anti-Stokes light changes by a large amount due to temperature. In other words, the Stokes light has low temperature dependency, and the anti-Stokes light has high temperature dependency.

As illustrated in FIG. 1, these types of backscattered light return in the optical fiber 24 and are emitted through the light-source-side end portion thereof. Then, the light passes through the lens 22b, is reflected by the beam splitter 23, and enters the wavelength separation section 25.

The wavelength separation section 25 has beam splitters 31a, 31b, 31c, optical filters 33a, 33b, 33c, and condenser lenses 34a, 34b, 34c. The beam splitters 31a, 31b, 31c either transmit or reflect light depending on the wavelength of the light. The optical filters 33a, 33b, 33c each transmit light of a particular wavelength, and the condenser lenses 34a, 34b, 34c condense light transmitted by the optical filters 33a, 33b, 33c into light receiving parts 26a, 26b, and 26c of the photodetector 26, respectively.

The light entering the wavelength separation section 25 is separated by the beam splitters 31a, 31b, 31c and the optical filters 33a, 33b, 33c into Rayleigh scattered light, Stokes light, and anti-Stokes light, and the separated light beams are inputted to the light receiving parts 26a, 26b, and 26c of the photodetector 26. As a result, the photodetector 26 outputs signals corresponding to the respective intensities of the Rayleigh scattered light, the Stokes light, and the anti-Stokes light.

The temperature distribution measurement unit 27 is configured with a computer. This temperature distribution measurement unit 27 obtains a temperature distribution in the longitudinal direction of the optical fiber 24 based on the signals outputted from the photodetector 26. In addition, as will be described later, the temperature distribution measurement unit 27 stores a database of transfer functions for respective entire lengths of the optical fiber 24 and areas (areas obtained by dividing the length of the optical fiber 24), and performs computation for correcting a transfer function when the laying condition of the optical fiber 24 is changed.

Figure 3:
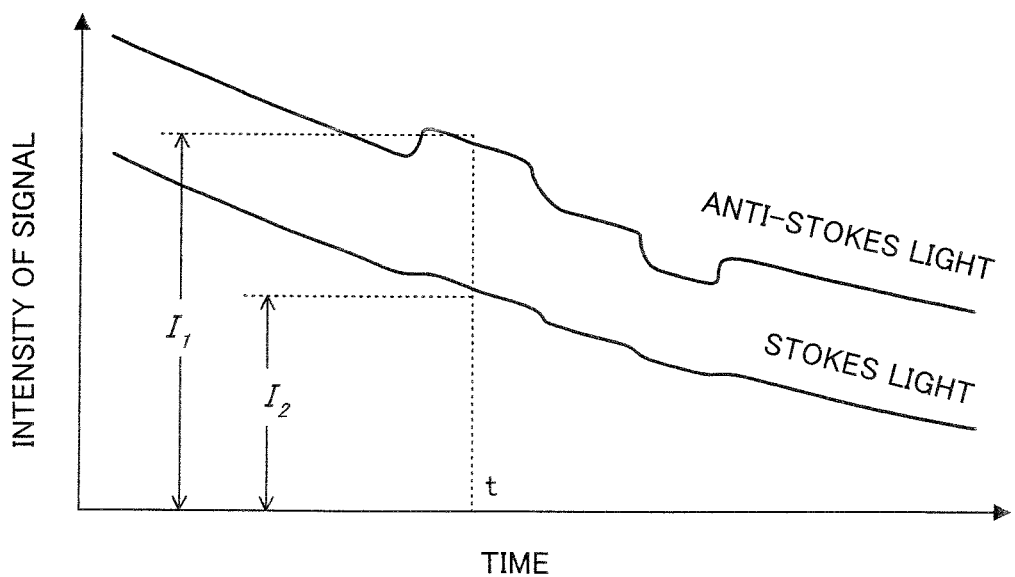
FIG. 3 is a diagram illustrating an example of a time-series distribution of the intensity of Raman scattered light.

FIG. 3 is a diagram illustrating an example of a time-series distribution of the intensity of Raman scattered light, in which the horizontal axis represents time and the vertical axis represents the intensity of the signal outputted from the light receiving part 26a, 26b, 26c of the photodetector 26. For a certain period of time immediately after a laser pulse enters the optical fiber 24, Stokes light and anti-Stokes light are detected by the photodetector 26. When the temperature is even throughout the entire length of the optical fiber 24, the signal intensity decreases with time from the time point when the laser pulse enters the optical fiber 24. In this case, the time on the horizontal axis represents a distance from the light-source-side end potion of the optical fiber 24 to a position where backscatter occurs, and a decrease in the signal strength with time indicates light attenuation in the optical fiber 24.

When the optical fiber 24 does not have an even temperature throughout the entire length thereof but has, for example, a high-temperature area and a low-temperature area in its longitudinal direction, the signal strengths of the Stokes light and the anti-Stokes light are not uniformly attenuated, but a curve line of each of them representing a temporal change in the signal strength has a peak and a valley, as illustrated in FIG. 3. In FIG. 3, $I_1$ and $I_2$ denote the intensities of anti-Stokes light and Stokes light, respectively, at a certain time point t.

Figure 4:
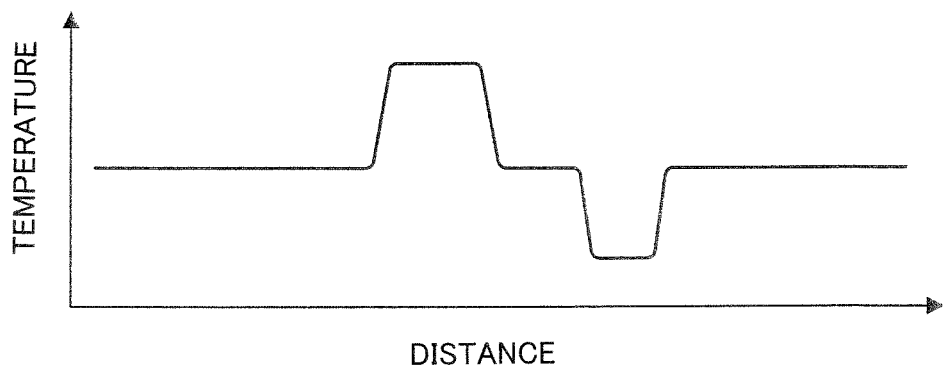
FIG. 4 is a diagram illustrating results obtained by calculating an $I_1/I_2$ ratio for each time point based on the time-series distribution of the intensity of Raman scattered light in FIG. 3 and converting the horizon axis (time) and the vertical axis (signal intensity) in FIG. 3 into distance and temperature, respectively.

FIG. 4 is a diagram illustrating results obtained by calculating an $I_1/I_2$ ratio for each time point based on the time-series distribution of the intensities of Raman scattered light in FIG. 3 and converting the horizon axis (time) and the vertical axis (signal intensity) in FIG. 3 into distance and temperature, respectively. As illustrated in FIG. 4, the temperature distribution in the longitudinal direction of the optical fiber 24 may be measured by calculating the intensity ratios ($I_1/I_2$) of the anti-Stokes light and the Stokes light.

Note that, although the intensity of the Raman scattered light (Stokes light and anti-Stokes light) at the position where the backscatter occurs changes depending on temperature, the intensity of Rayleigh scattered light is thought not to be dependent on temperature. Hence, it is preferable to identify the position of the backscatter based on the intensity of Rayleigh scattered light and correct the intensities of the Stokes light and the anti-Stokes light detected by the photodetector 26, according to the position thus identified.

Figure 5A:
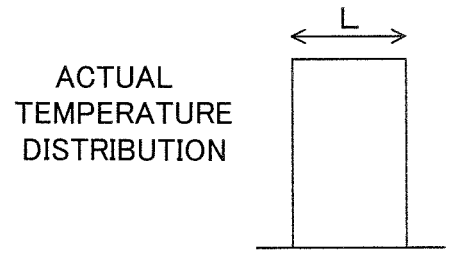
FIGS. 5A and 5B are diagrams illustrating a minimum heated length (part 1)
Figure 5B:
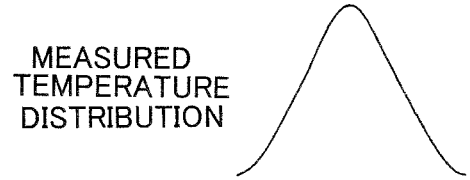
Figure 6:
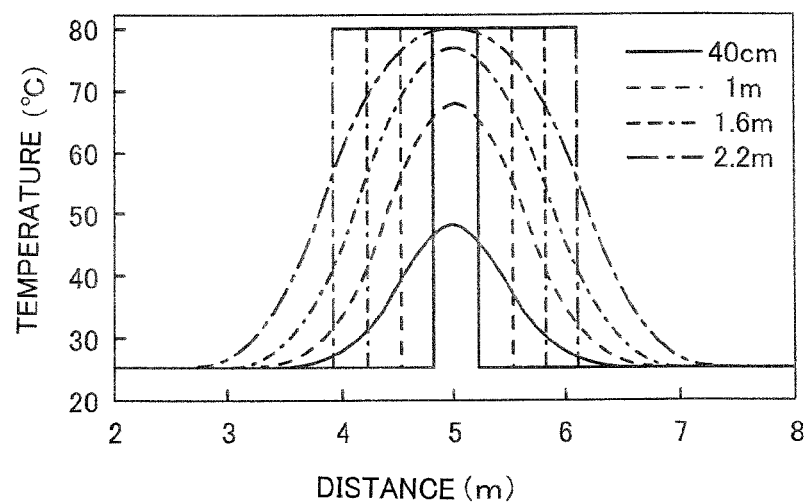
FIG. 6 is a diagram illustrating a minimum heated length (part 2)

With reference to FIGS. 5 and 6, a minimum heated length is described below.

Suppose here that a pulse width $t_0$ of laser light outputted from the laser light source 21 is 10 nsec, a speed c of light in vacuum is $3 \times 10^8$ m/sec, and a refractive index n of the core 24b of the optical fiber 24 is 1.5. In this case, a pulse width W of the laser light in the optical fiber 24 is about 2m, as expressed in Formula (1) below.

[Expression 1]

$$W = t_0 \cdot c/n = 10(n\ \sec) \cdot 3 \times 10^8 (m/\sec)/1.5 \approx 2(m) \quad (1)$$

Backscattered light of the laser light of this pulse width is brought as one signal into the photodetector 26, and the photodetector 26 detects a temperature from an integrated value of signals for this pulse width. For this reason, the temperature is not accurately measured unless heat is evenly applied to the optical fiber for a length corresponding to the pulse width W. Hereinbelow, a minimum heated length for accurate temperature measurement is denoted as Lmin.

When the optical fiber 24 is heated with an actual temperature distribution illustrated in FIG. 5A, i.e., when a length L of the optical fiber 24 is evenly heated, the measured temperature distribution, as illustrated in FIG. 5B, exhibits a curve line like a Gaussian graph (normal distribution). A temperature distribution like the one illustrated in FIG. 5A is called a step-like temperature distribution.

FIG. 6 is a diagram illustrating a measured temperature distribution, in which the horizontal axis represents a longitudinal position in the optical fiber and the vertical axis represents a temperature. The optical fiber is placed under a temperature environment of 25° C., and heat of 80° C. is applied to acquire a step-like temperature distribution focusing around the position 5 m apart from the light source. Here, the lengths of heated portions are 40 cm, 1 m, 1.6 m, and 2.2 m. As be seen from FIG. 6, the observed peak of the measured temperature distribution is lower than the actual temperature when the length of the heated portion is shorter than 2 m (the minimum heated length Lmin), and the peak of the measured temperature distribution almost coincides with the actual temperature when the length of the heated portion is equal to or larger than 2 m.

Figure 7:
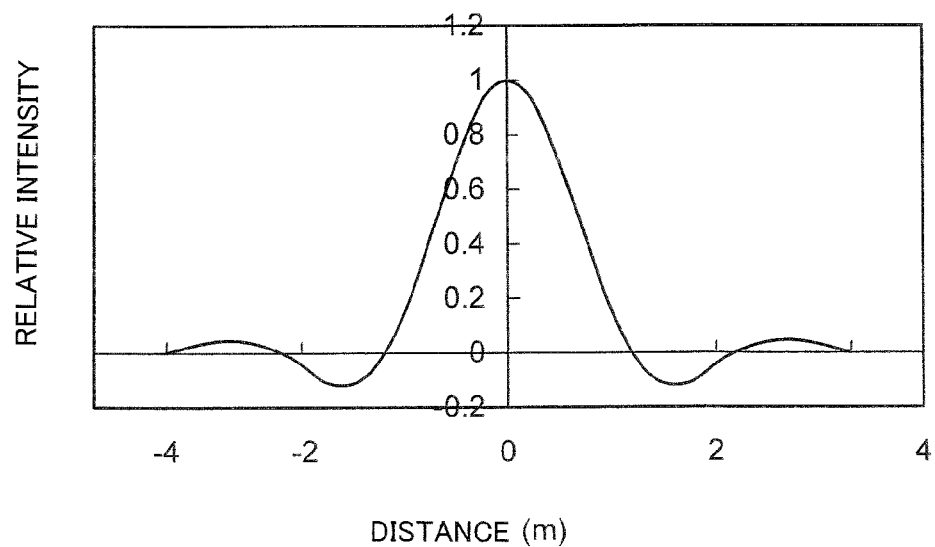
FIG. 7 is a diagram illustrating an example of a transfer function.

FIG. 7 is a diagram illustrating a transfer function (a transfer function of a temperature measurement system) in the temperature distribution in FIG. 6, in which the horizontal axis represents a distance from the heating center and the vertical axis represents a relative intensity. The measured temperature distribution in FIG. 6 is obtained by performing convolution of the transfer function in FIG. 7 on the step-like temperature distribution in FIG. 6. Conversely, a temperature distribution approximate to an actual temperature distribution (a corrected measured temperature distribution) is obtained by correcting (performing deconvolution on) the measured temperature distribution using an inverse function of the transfer function (inverse correction function). Note that the transfer function is almost equal to an impulse response property of the temperature measurement system (a temperature distribution measurement apparatus and the optical fiber).

The transfer function of the temperature measurement system changes depending on distance since the optical fiber 24 has group delay characteristics. For this reason, a single transfer function is not defined for the entire length of the optical fiber 24. However, a single transfer function may be defined for the same short distance in which loss or delay in an optical signal is considered uniform. Thus, it is important to set in advance a transfer function used for the correction calculation, for each unit area of a certain length (e.g., 1000 m) in the longitudinal direction of the optical fiber 24.

On the other hand, a temperature measurement point (simply called a "measurement point" hereinbelow) may be determined without considering the minimum heated length but considering the sampling frequency and the like of the measurement apparatus. In view of a practical measurement time period such as a time period for averaging in the measurement apparatus, the interval of the measurement points may be set to about 10 cm to 50 cm.

Figure 8:
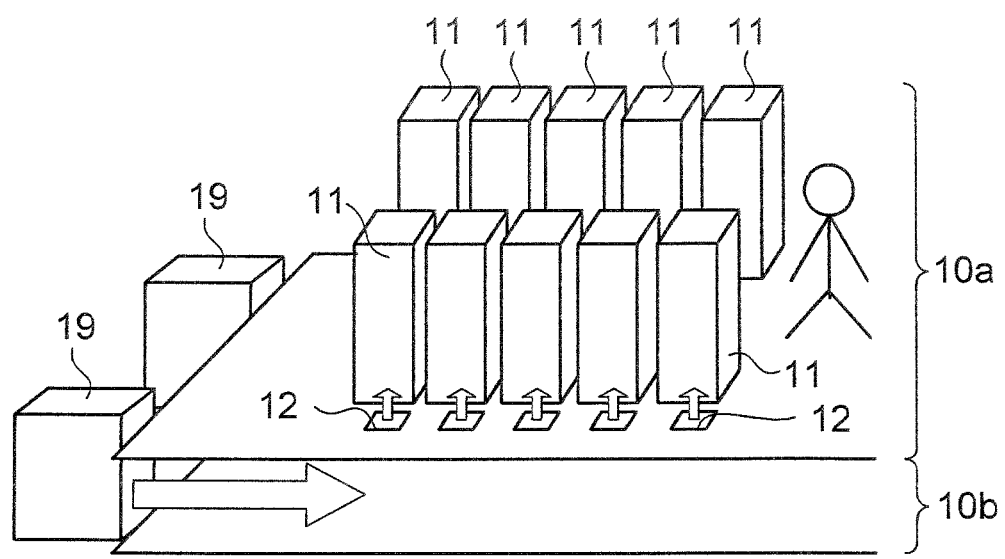
FIG. 8 is a schematic diagram illustrating a computer room in a data center.

FIG. 8 is a schematic diagram illustrating a computer room in a data center. As illustrated in FIG. 8, the computer room is divided into an equipment installed area 10a and a free-access floor 10b. A plurality of racks (server racks) 11 are placed in the equipment installed area 10a, and each rack 11 houses a plurality of computers (such as a blade server). The equipment installed area 10a is also provided with a route for a manager to walk through and a management space for managing the computers.

The free-access floor 10b is provided under the floor of the equipment installed area 10a. On this free-access floor 10b, power cables, communication cables, and the like connected to the racks 11 are placed.

The temperature of the free-access floor 10b is maintained constant by cool air supplied from air conditioners 19. Ventilators (grilles) 12 are provided in the floor of the equipment installed area 10a, and cool air is fed from the free-access floor 10b to the front face sides (air suction sides) of the racks 11 via these ventilators 12 to cool the computers in the racks 11.

Figure 9:
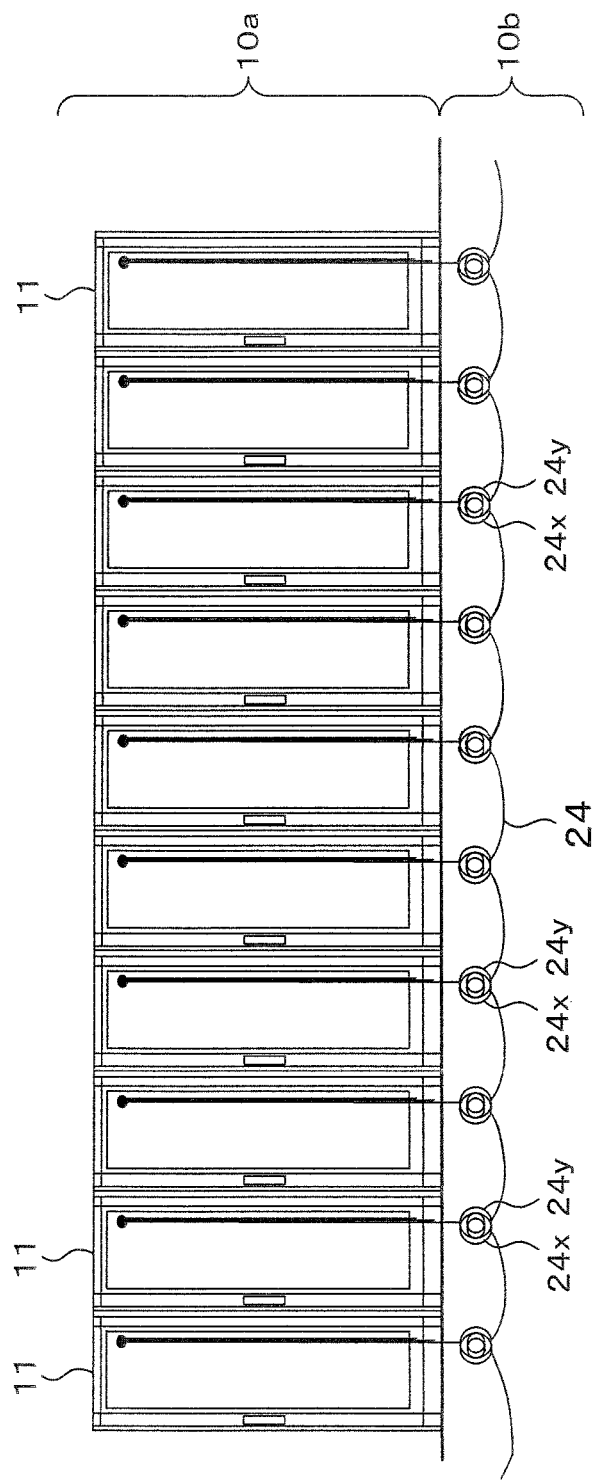
FIG. 9 is a diagram illustrating an example of how an optical fiber is laid.

FIG. 9 is a diagram illustrating an example of how the optical fiber 24 is laid. In this example, a first winding portion 24x and a second winding portion 24y are provided for each rack 11 and placed on the free-access floor 10b, the first and second winding portions 24x, 24y each being formed by winding the minimum heated length Lmin or longer of the optical fiber 24. A portion of the optical fiber 24 between the first winding portion 24x and the second winding portion 24y is laid to extend up and then down inside the rack 11.

When the optical fiber 24 of twice or more as long as the minimum heated length Lmin is placed on the free-access floor 10b between the racks 11, the temperature distribution measurement apparatus 20 may measure the actual temperature of the free-access floor 10b without being affected by the internal temperature of the rack 11. In addition, the internal temperature of the rack 11 does not fall below the temperature of the free-access floor 10b.

Under such conditions, a distribution of the temperature inside the rack 11 may be accurately obtained by correcting a temperature measured at each measurement point in the rack 11, based on the measured temperature of the free-access floor 10b (see Patent Documents 1 and 2).

Figure 10:
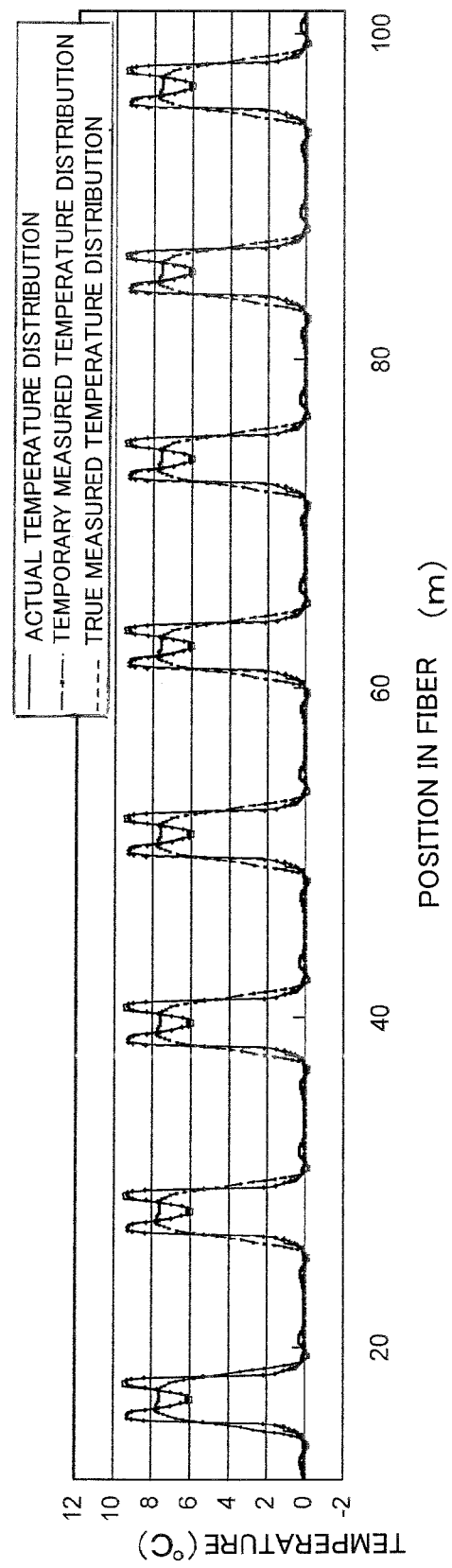
FIG. 10 is a diagram illustrating examples of an actual temperature distribution, a measured temperature distribution, and a corrected temperature distribution.

FIG. 10 illustrates an actual temperature distribution, a temporary measured temperature distribution, and a true measured temperature distribution. Here, the actual temperature distribution indicates an actual temperature at each measurement point, the temporary measured temperature distribution is a temperature distribution obtained from the ratios of Stokes light and anti-Stokes light (a temperature distribution before correction), and the true measured temperature distribution is a temperature distribution obtained by performing correction calculation on the temporary measured temperature distribution by use of a transfer function.

It is seen from FIG. 10 that the true measured temperature distribution almost coincides with the actual temperature distribution. Note that the temperature on the vertical axis in FIG. 10 is the difference from a reference temperature (the temperature of the free-access floor 10b).

As described above, the transfer function, which is used in correcting the temporary measured temperature distribution to obtain the true measured temperature distribution, changes depending on the entire length of the optical fiber and a longitudinal position in the optical fiber.

Figure 11A:
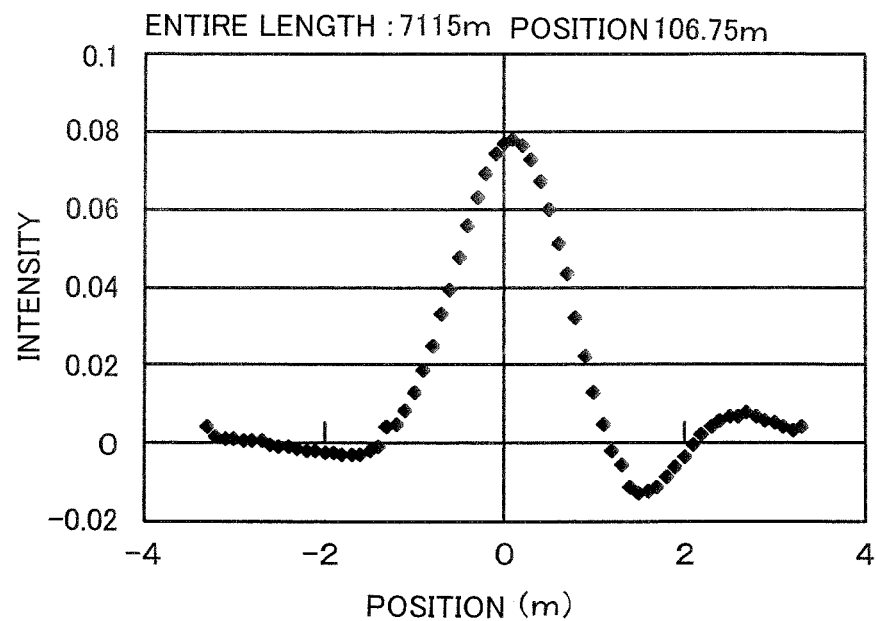
FIGS. 11A to 11D are diagrams illustrating examples of transfer functions for each position in an optical fiber whose entire length is 7115 m.
Figure 11B:
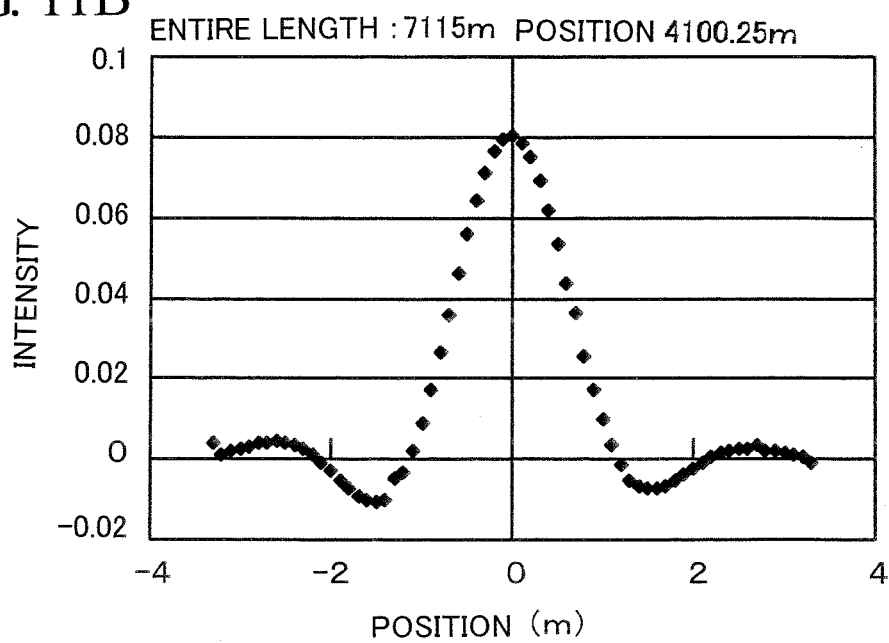
Figure 11C:
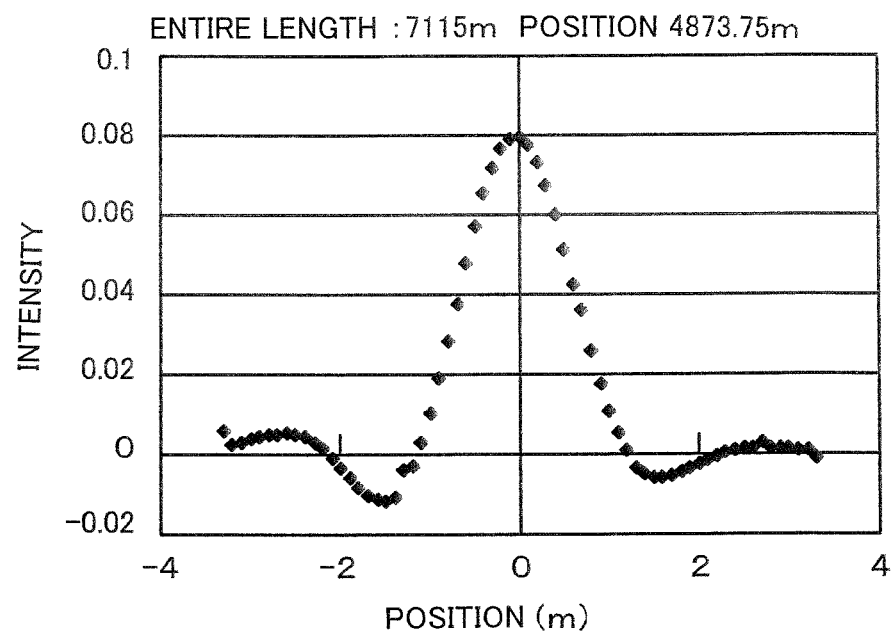
Figure 11D:
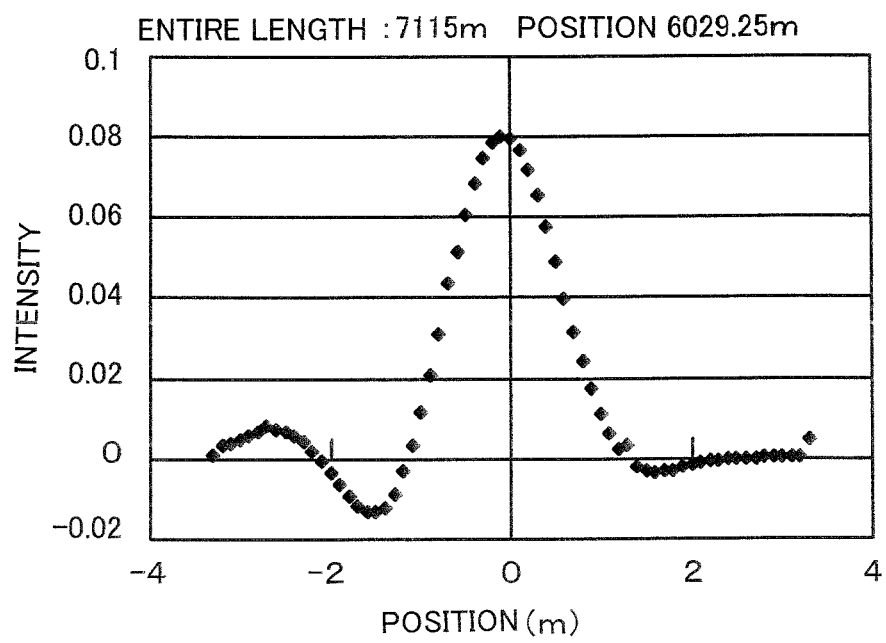
Figure 12A:
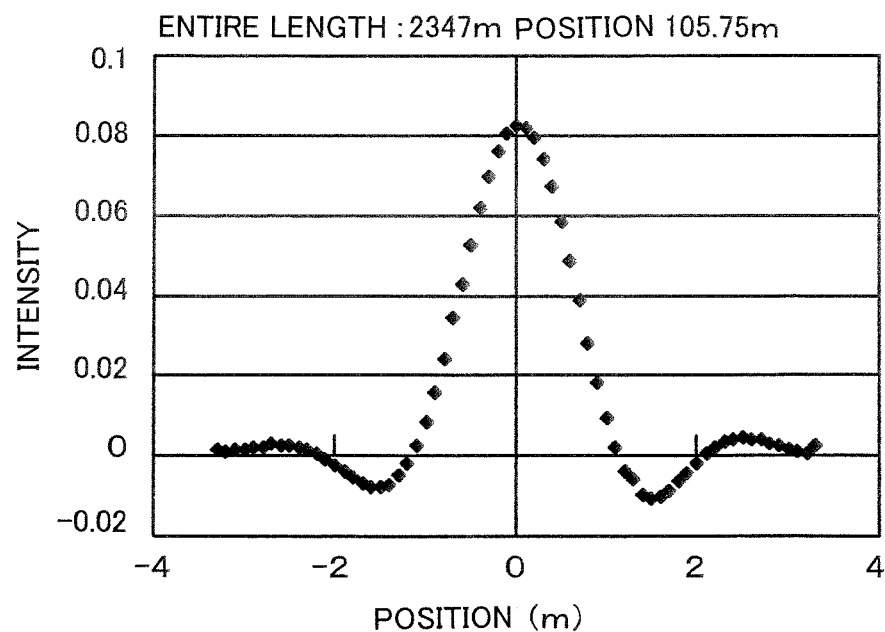
FIGS. 12A to 12C are diagrams illustrating examples of transfer functions for each position in an optical fiber whose entire length is 2347 m.
Figure 12B:
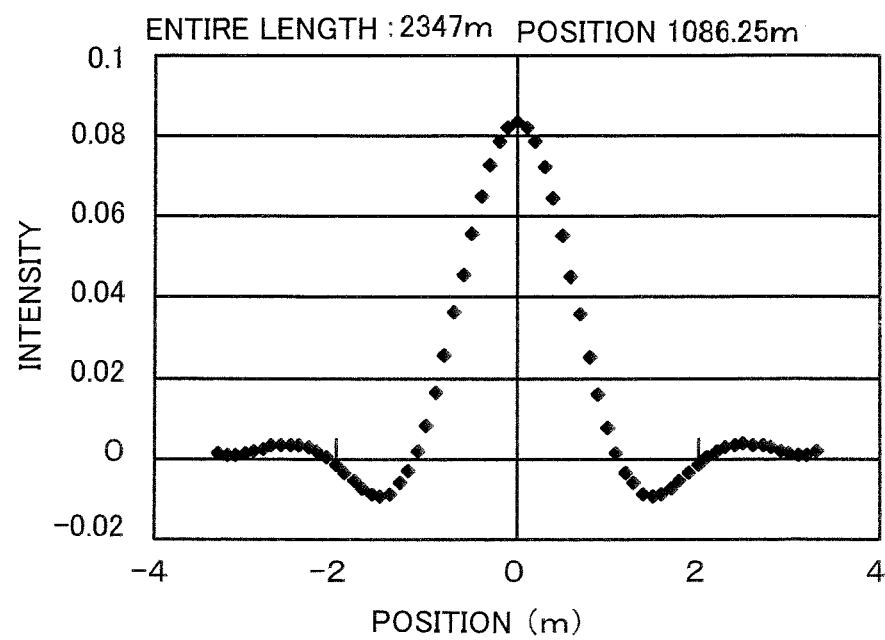
Figure 12C:
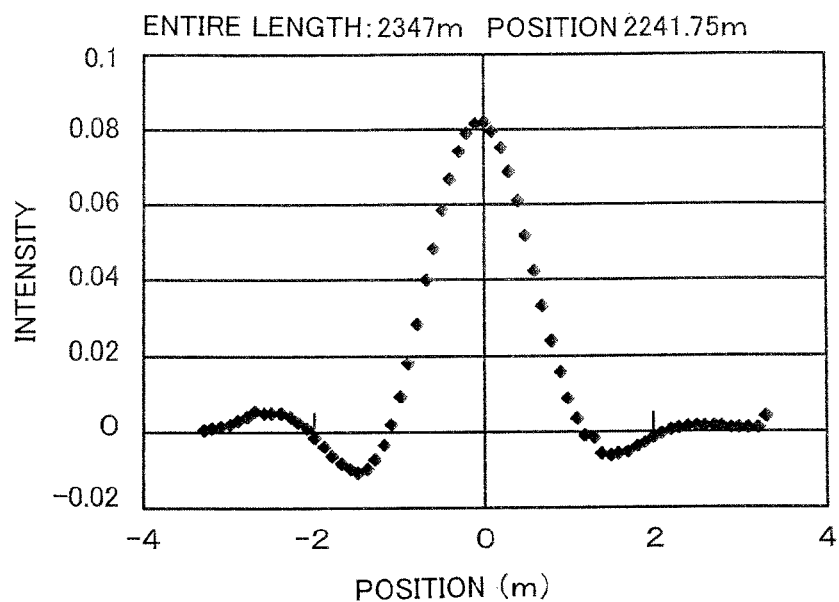

FIGS. 11A to 11D are diagrams illustrating examples of transfer functions at positions (106.75 m, 4100.25 m, 4873.75 m, and 6028.25 m) in an optical fiber whose entire length is 7115 m. Moreover, FIGS. 12A to 12C are diagrams illustrating examples of transfer functions at positions (105.75 m, 1086.25 m, and 2241.75 m) in an optical fiber whose entire length is 2347 m. It is seen FIGS. 11A to 11D and FIGS. 12A to 12C that the transfer functions vary depending on the entire length of the optical fiber or a longitudinal position in the optical fiber.

Figure 13:
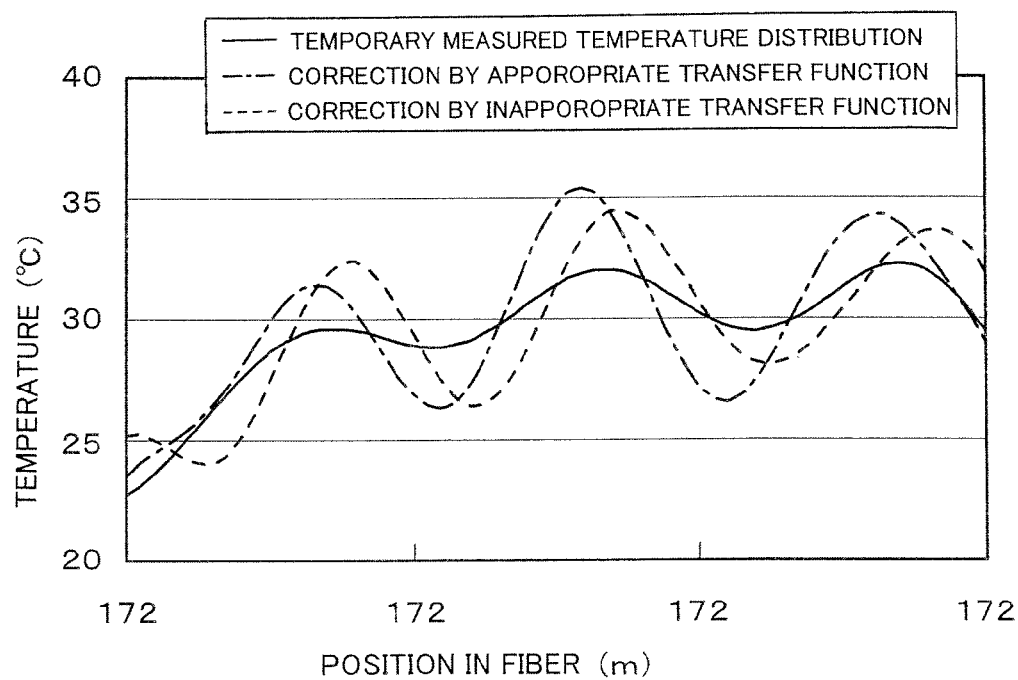
FIG. 13 is a diagram illustrating a measured temperature distribution and a temperature distribution corrected by use of a transfer function.

FIG. 13 is a diagram illustrating a temporary measured temperature distribution and temperature distributions corrected using different transfer functions. The horizontal axis and the vertical axis in FIG. 13 are a longitudinal position in the optical fiber and temperature, respectively. In FIG. 13, a dashed-dotted line depicts an example of a temperature distribution obtained by correcting the temporary measured temperature distribution by use of an appropriate transfer function, and a dashed line depicts an example of a temperature distribution obtained by correcting the temporary measured temperature distribution by use of an inappropriate transfer function. Here, the entire length of the optical fiber is 7155 m, and the transfer function illustrated in FIG. 11A is used as the appropriate transfer function, and the transfer function illustrated in FIG. 11D is used as the inappropriate transfer function.

It is seen from FIG. 13 that a temperature distribution is not accurately measured when the inappropriate transfer function is used. In this example, the peak position in the temperature distribution corrected by use of the inappropriate transfer function is shifted by up to about 50 cm from that in the temperature distribution corrected by use of the appropriate transfer function.

Thus, in this embodiment, the transfer functions are obtained in advance in association with the entire length of the optical fiber and the longitudinal position in the optical fiber, and are stored as database in the temperature distribution measurement unit 27. For example, a plurality of optical fibers whose entire lengths are different from one another are prepared, and a transfer function is experimentally obtained for every 1000 m of each optical fiber. The transfer function may be found from a measured temperature distribution obtained by heating the optical fiber in such a manner as to obtain a step-like temperature distribution as described earlier.

FIG. 14 is a diagram illustrating an example of a database of transfer functions obtained in such a way. In FIG. 14, for example, $H_{4000, 3000}(p)$ is a transfer function for a 3000-m position in an optical fiber whose entire length L is 4000 m (the 3000-m position being a position away from the light-source-side end portion of the optical fiber in its longitudinal direction). In addition, (p) indicates an element (point in FIGS. 11A to 11D and FIGS. 12A to 12C) constituting the transfer function. Note that, if it is difficult to experimentally obtain a transfer function for an end portion of the optical fiber, it suffices to obtain a transfer function for a position away from the end portion by a predetermined distance ($\alpha$).

Here, a description is given of a case of obtaining a transfer function for a position X in an optical fiber having an entire length L, through linear approximation.

First, from FIG. 14 (database), values $L^+$ and $L^-$ and $X^+$ and $X^-$ in the database which are proximate to L are determined. For example, in a case where the entire length L of an optical fiber is changed to 3700 m and the position X in the optical fiber in the longitudinal direction is 2600 m, $L^+$ is 4000 m, $L^-$ is 3000 m, $X^+$ is 3000 m, and $X^-$ is 2000 m.

Next, using Formula (2) below, a transfer function $H'_{L+, X}(p)$ for the longitudinal position X in the optical fiber whose entire length is $L^+$ is calculated from a transfer function $H_{L+, X+}(p)$ and a transfer function $H_{L+, X-}(p)$ in FIG. 14 (database).

[Expression 2]

$$H'_{L+, X}(p) = \frac{X - X^-}{X^+ - X^-} H_{L+, X+}(p) + \frac{X^+ - X}{X^+ - X^-} H_{L+, X-}(p) \quad (2)$$

Similarly, using Formula (3) below, a transfer function $H'_{L-, X}(p)$ for the longitudinal position X in the optical fiber whose entire length is $L^-$ is calculated from a transfer function $H_{L-, X+}(p)$ and a transfer function $H_{L-, X-}(p)$ in FIG. 14 (database).

[Expression 3]

$$H'_{L-, X}(p) = \frac{X - X^-}{X^+ - X^-} H'_{L-, X+}(p) + \frac{X^+ - X}{X^+ - X^-} H_{L-, X-}(p) \quad (3)$$

Next, using Formula (4) below, a transfer function $H'_{L, X}(p)$ for the longitudinal position X in the optical fiber whose entire length is L is calculated from the transfer function $H'_{L+, X}(p)$ and the transfer function $H'_{L-, X}(p)$ obtained by Formulae (2) and (3), respectively.

[Expression 4]

$$H'_{L,X}(p) = \frac{L - L^-}{L^+ - L^-}H'_{L^+,X}(p) + \frac{L^+ - L}{L^+ - L^-}H'_{L^-,X}(p) \qquad (4)$$

In this way, the transfer function H'$_{L,X}$(p) for any position in an optical fiber having any entire length may be calculated.

The calculation of the transfer function described above is performed in response to a command by a worker after completion of work for changing how the optical fiber 24 is laid due to addition or removal of the racks 11.

For example, the worker inputs data, such as the entire length of the optical fiber 24 or a position to be changed (a longitudinal position in the optical fiber), into the temperature distribution measurement apparatus 20 via an input device. With this, the temperature distribution measurement unit 27 of the temperature distribution measurement apparatus 20 calculates a transfer function for each predetermined area (e.g., of 1000 m) from the inputted data, and sets the transfer function as a transfer function to be used in correcting a measured temperature distribution for the predetermined area.

Further, the temperature distribution measurement apparatus 20 may figure out the entire length of the optical fiber based on, for example, time it takes for laser light to reach the end portion of the optical fiber or time it takes for backscattered light to no longer be detected. Thus, once the worker commands calculation of a transfer function, the temperature distribution measurement apparatus 20 may automatically acquire the entire length of the optical fiber, calculate a transfer function for each predetermined area (e.g., of 1000 m) and set it as a transfer function to be used in correcting a temperature distribution for the predetermined area.

As described above, according to this embodiment, an appropriate transfer function may easily be set when the entire length or measurement points of an optical fiber are changed due to addition or removal of rack or the like. Thereby, temperature distribution measurement may be performed accurately and continuously.

Although this embodiment describes temperature distribution measurement for a computer room in a data center, the techniques disclosed herein may be applied to temperature distribution measurement in other institutions such as an office building or a factory.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A temperature distribution measurement apparatus comprising:
    a laser light source optically connected to an optical fiber;
    a photodetector configured to detect light backscattered in the optical fiber; and
    a temperature distribution measurement unit configured to obtain a true measured temperature distribution by performing correction calculation using a transfer function on a temporary measured temperature distribution obtained based on an output from the photodetector, wherein
    the temperature distribution measurement unit stores therein data on a transfer function set for each entire length of the optical fiber and for each longitudinal position in the optical fiber, the data on a transfer function set for each longitudinal position in the optical fiber being data on an area focusing around a point of a longitudinal position in the optical fiber and having a predetermined length, and
    when the entire length of the optical fiber connected to the laser light source is changed, the temperature distribution measurement unit selects, from the data on the transfer function set for each entire length of the optical fiber and for each longitudinal position in the optical fiber, a transfer function for an entire length of the optical fiber close to the changed entire length of the optical fiber, and changes the transfer function to be used in the correction calculation by using the selected transfer function.

2. The temperature distribution measurement apparatus according to claim 1, wherein
    the transfer function to be used in the correction calculation is calculated by linear approximation.

3. The temperature distribution measurement apparatus according to claim 1, wherein
    the temperature distribution measurement unit calculates the true measured temperature distribution by applying an inverse function of the transfer function to the temporary measured temperature distribution.

4. The temperature distribution measurement apparatus according to claim 1, wherein
    the transfer function set for each longitudinal position in the optical fiber is a function indicating a relationship between distances from a longitudinal position in the optical fiber and relative intensities of temperature.

5. A temperature distribution measurement method employed by a temperature distribution measurement apparatus configured to output laser light from a laser light source to an optical fiber, obtain a temporary measured temperature distribution in a longitudinal direction of the optical fiber by detecting light backscattered in the optical fiber, and obtain a true measured temperature distribution by performing correction calculation on the temporary measured temperature distribution by use of a transfer function, wherein
    the temperature distribution measurement apparatus stores therein data on a transfer function set for each entire length of the optical fiber and for each longitudinal position in the optical fiber, the data on a transfer function set for each longitudinal position in the optical fiber being data on an area focusing around a point of a longitudinal position in the optical fiber and having a predetermined length, and
    when an entire length of the optical fiber optically connected to the laser light source is changed, the temperature distribution measurement apparatus selects, from the data on the transfer function set for each entire length of the optical fiber and for each longitudinal position in the optical fiber, a transfer function for an entire length of the optical fiber close to the changed entire length of the optical fiber, and changes the transfer function to be used in the correction calculation by using the selected transfer function.

6. The temperature distribution measurement method according to claim 5, wherein
the transfer function to be used in the correction calculation is calculated by linear approximation.

7. The temperature distribution measurement method according to claim 5, wherein
the optical fiber optically connected to the laser light source has a winding portion at a location where a temperature is maintained constant, the winding portion being formed by winding a certain length or more of the optical fiber.

8. The temperature distribution measurement method according to claim 5, wherein
the optical fiber optically connected to the laser light source is laid in a rack in which a computer is housed.

9. The temperature distribution measurement method according to claim 5, wherein
the temperature distribution measurement apparatus selects, from the data on the transfer function set for each entire length of the optical fiber and for each longitudinal position in the optical fiber, a transfer function for an entire length of the optical fiber and a longitudinal position in the optical fiber close to an inputted entire length of the optical fiber and an inputted longitudinal position in the optical fiber, and changes the transfer function to be used in the correction calculation by using the selected transfer function.

10. The temperature distribution measurement method according to claim 5, wherein
the temperature distribution measurement apparatus obtains the entire length of the optical fiber based on time it takes for the laser light emitted from the laser light source to reach an end portion of the optical fiber or time it takes for the backscattered light to no longer be detected, selects, from the data on the transfer function set for each entire length of the optical fiber and for each longitudinal position in the optical fiber, a transfer function for an entire length of the optical fiber close to the obtained entire length of the optical fiber, and changes the transfer function to be used in the correction calculation by using the selected transfer function.

11. The temperature distribution measurement method according to claim 5, wherein
the temperature distribution measurement apparatus calculates the true measured temperature distribution by applying an inverse function of the transfer function to the temporary measured temperature distribution.

12. The temperature distribution measurement method according to claim 5, wherein
the transfer function set for each longitudinal position in the optical fiber is a function indicating a relationship between distances from a longitudinal position in the optical fiber and relative intensities of temperature.

* * * * *